(12) United States Patent
Ernst et al.

(10) Patent No.: US 8,325,220 B2
(45) Date of Patent: Dec. 4, 2012

(54) STEREOSCOPIC IMAGE DISPLAY METHOD AND APPARATUS, METHOD FOR GENERATING 3D IMAGE DATA FROM A 2D IMAGE DATA INPUT AND AN APPARATUS FOR GENERATING 3D IMAGE DATA FROM A 2D IMAGE DATA INPUT

(75) Inventors: Fabian Edgar Ernst, Eindhoven (NL); Bart Gerard Bernard Barenbrug, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1218 days.

(21) Appl. No.: 12/095,183

(22) PCT Filed: Nov. 27, 2006

(86) PCT No.: PCT/IB2006/054458
§ 371 (c)(1),
(2), (4) Date: May 28, 2008

(87) PCT Pub. No.: WO2007/063478
PCT Pub. Date: Jun. 7, 2007

(65) Prior Publication Data
US 2008/0303894 A1   Dec. 11, 2008

(30) Foreign Application Priority Data
Dec. 2, 2005   (EP) .................................. 05111623

(51) Int. Cl.
*H04N 15/00* (2006.01)
*H04N 13/00* (2006.01)

(52) U.S. Cl. ........... 348/43; 345/419; 382/103; 382/154

(58) Field of Classification Search .................... 348/51, 348/42; 345/419; 382/103, 154
See application file for complete search history.

(56) References Cited

U.S. PATENT DOCUMENTS

| | | | | |
|---|---|---|---|---|
| 6,477,267 | B1 * | 11/2002 | Richards | 382/154 |
| 7,764,827 | B2 * | 7/2010 | Op De Beeck et al. | 382/154 |
| 7,999,844 | B2 * | 8/2011 | Richards | 348/42 |
| 2002/0118275 | A1 * | 8/2002 | Harman | 348/51 |
| 2005/0031166 | A1 * | 2/2005 | Fujimura et al. | 382/103 |
| 2007/0024614 | A1 * | 2/2007 | Tam et al. | 345/419 |

FOREIGN PATENT DOCUMENTS

| | | |
|---|---|---|
| EP | 1021049 A2 | 7/2000 |
| WO | WO2004061765 A2 | 7/2004 |
| WO | WO2005013623 A1 | 2/2005 |

OTHER PUBLICATIONS

Elder et al: "Local Scale Control for Edge Detection and Blur Estimation"; IEEE Transactions on Pattern Analysis and Machine Intelligence, IEEE Service Center, Los Alamitos, CA, US, vol. 20, No. 7, Jul. 1998, pp. 699-716.

* cited by examiner

*Primary Examiner* — Dustin Nguyen (57) ABSTRACT

2D image data are converted into 3D image data. The image is divided, on the basis of focusing characteristics, into two or more regions, it is determined to which region an edge separating two regions belongs. The regions are depth ordered in accordance with the rule that the rule that a region comprising an edge is closer to the viewer than an adjacent region and to the regions 3-D depth information is assigned in accordance with the established depth order of the regions. Preferably to each of the regions a depth is assigned in dependence on an average or median focusing characteristic of the region.

12 Claims, 8 Drawing Sheets

STEREOSCOPIC IMAGE DISPLAY METHOD AND APPARATUS, METHOD FOR GENERATING 3D IMAGE DATA FROM A 2D IMAGE DATA INPUT AND AN APPARATUS FOR GENERATING 3D IMAGE DATA FROM A 2D IMAGE DATA INPUT

The invention relates to a stereoscopic image display method wherein 2D image data are converted into 3D image data and wherein focus information is extracted from the 2D image data and used for generating the 3D image data.

The invention also relates to a stereoscopic image display device comprising an input for 2D image data and a converter to convert the input 2D image data into 3D image data the converter comprising a focus information extractor for extracting focus information from the 2D image data.

The invention also relates to an image display data conversion method wherein 2D image data are converted into 3D image data and wherein focus information is extracted from the 2D image data and used for generating the 3D image data.

The invention further relates to a 3D image signal.

The invention further relates to a computer program product to be loaded by a computer arrangement, comprising instructions to generate 3D image data on basis of a 2D image data input, the computer arrangement comprising processing means.

A stereoscopic image display method and device of the kind described in the opening paragraph is disclosed in EP 1 021 049. In EP 1 021 049 a 3 dimensional video image is generated from a 2 dimensional video input. The known device and method uses a foreground/background discriminating circuit which discriminates on the basis of focus information which is extracted from the 2 dimensional video input. A parallax control signal is outputted on the basis of edge detecting wherein sharp edges are placed in the foreground of the 3D image.

Although the known method and device provide for a relatively simple device and method, it has been found that the rendered 3D images occasionally are confusing images wherein depth of vision, i.e. the 3D effect, is difficult to distinguish.

It is an object of the invention to improve 3D image rendering based on a 2D image input.

To this end the method in accordance with the invention is characterized in that on basis of focus characteristics the image is divided into two or more regions, it is determined to which region of the image an edge separating two regions belongs and a depth order is established between the regions following the rule that a region comprising an edge is closer to the viewer than an adjacent region and to the regions 3-D depth information is assigned in accordance with the established depth order of the regions.

In the prior art method of EP 1 021 049 edge detection is also performed. Sharp edges are placed in the foreground. This scheme, however, sometimes provides for confusing results since parts of the images that are in reality in the foreground are given background parallax and vice versa in case the background happened to be in focus and the foreground out-of-focus. This provides for confusing images wherein the parallax information provides the viewer the cue that certain parts of the 3D image are on the foreground and others parts in the background, but the actual content of the image provides the viewer with a completely opposite cue, i.e. what is foreground according the parallax cue is background according to the actual content.

The 3D sensation is then confusing at best and often lost, especially since the depth cue given by the known method is usually limited. It is assumed that the human brain is capable of reconstructing a stereoscopic sense from even an imperfect depth cue. The depth cues in the prior art method and device are, however, sometimes at odds with each other, and may even change from scene to scene, i.e. in one scenes the depth cues may be correct, followed by a sudden shift to conflicting depth cues wherein a foreground figure hides behind a background tree. The depth sensation is then lost or at least a very annoying conflict between depth cues is perceived by the viewer.

The method in accordance with the invention solves or at least reduces the problem. The image is divided in regions on the basis of focus information, for instance the blur radius. The pixels or blocks of the image are clustered into a number of regions having similar focus characteristic. Based on the focus information, e.g. the average blur per block, the image is divided into two or more regions wherein each region has averaged focusing characteristics. It is determined to which region an edge separating two regions belongs. This may e.g. be done by comparing the sharpness (blur) of a detected edge to the average blur of the regions bordering either side of the edge. A blurred edge belongs to a bordering region having a high blur, whereas a sharp edge to a region having a low blur. A depth ordering is performed on the regions, wherein the rule is followed that a region comprising an edge is closer to the viewer than the adjacent region. 3D information is assigned to the regions in accordance with the depth ordering. The various regions of the image thus form depth layers. Dividing the image into regions is performed by means of clustering pixels or blocks into regions. Although this clustering could be done on a pixel per pixel basis, it is found that more robust results are obtained when, prior to division of the image into regions, a focusing characteristic is determined per block of pixels and the blocks are clustered into regions. Blocks are small parts of the image having n×m pixels, usually m×m, where n and m are typically 2, 4, 8 or 16.

The advantage of the method in comparison to the known method is clear for e.g. an image in which a person is seated partially behind a flower arrangement. The person is in focus; the flower arrangement is not. Using the known method the person being in focus and thus having sharp image edges, is given a parallax so that it seems in the foreground and image portion depicting the flower arrangement, having a blurred edge, is given a parallax corresponding with background. This conflicts with the true situation since the person is partially behind the flower arrangement and not the other way around. The known method and device thus confronts the viewer with two conflicting, in fact irreconcilable, depth cues. The parallax depth cue, putting the person on the foreground in front of the flower arrangement, contradicts the image information depth cue, which shows the person seated behind the flower arrangement.

The method in accordance with the invention does not provide for conflicting depth cues. The image is divided into regions and comprises at least two regions, for instance an in focus region comprising the person and an out-of-focus region comprising the flower arrangement. The edges separating the regions comprising the flower arrangement and the region comprising the person are formed by the blurred edges of the flower arrangement. Thus the region of the image comprising the flower arrangement is placed on the foreground, in accordance with the rule that a region comprising the edge separating two regions is closer to a viewer than the other region. Out-of-focus foreground regions, which are bounded by blurred edges, are placed in front of in-focus background regions. Thus, if there are two regions, an out-of-focus foreground flower arrangement in front of an in-focus person, the correct parallax is assigned to both regions. If there are three regions, an out-of-focus foreground flower arrangement, an in-focus person and an out-of-focus background, the correct 3D information is provided for the three regions. It is emphasized that the results of the method in accordance with the invention provide, in this example, results that are against the very core of the teaching of EP 0 121 049, which dictates that depth ordering is done by placing sharp edges on the foreground.

Preferably the 3D depth information is assigned in dependence on the focusing characteristics of the regions. The average focusing characteristics provides a clue as to the difference in depth between the regions. This can be used to improve the 3D effect.

In preferred embodiments the number of regions is three or two. Clustering the pixels or blocks of the image into two or three regions has proven to give good results, while requiring only limited calculating power. Almost all images have an in-focus part, and an out-of-focus part, the out-of-focus part sometimes being foreground, sometimes being background, so that two regions often suffice. Occasionally the out-of-focus part comprises a fore-ground and background part, for instance a foreground tree and a background forest and an intermediate in-focus region, in which case three regions usually suffice.

In a preferred embodiment a statistical distribution is made of focusing characteristics of pixels or blocks of the image and the number of regions is determined in dependence on the statistical distribution.

It is found that the focusing characteristics, such a blur radius, often cluster around a limited number of peaks, one corresponding to a small blur radius, i.e. in focus or nearly in focus, and another or others at larger blur radii, corresponding to out of focus parts of the image. Using these statistical data allows for a quick determination of the number of regions in which the region can be divided.

The image display device in accordance with the invention comprises means for performing the method steps in accordance with the invention.

The invention is also embodied in a transmitter comprising means for performing the method steps in accordance with the invention.

These and other objects of the invention will be apparent from and elucidated with reference to the embodiments described hereinafter.

In the drawings.

The figures are not drawn to scale. Generally, identical components are denoted by the same reference numerals in the figures.

Figure 1:
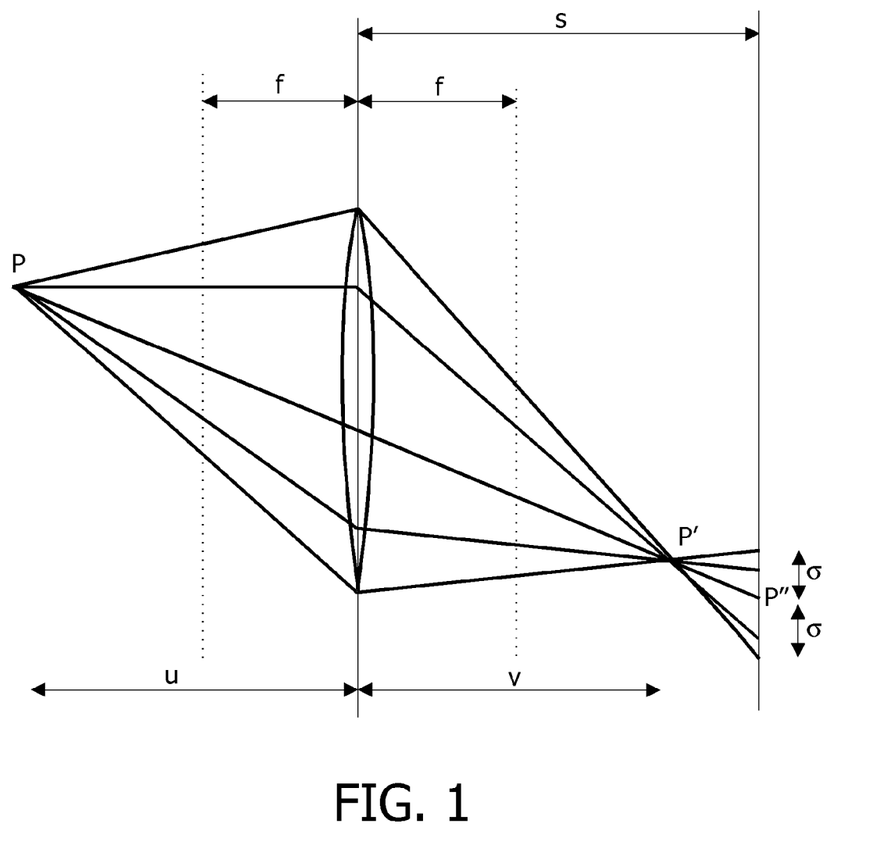
FIG. 1 illustrates the thin lens model.

In a simple optical system, like a convex thin lens, objects at a particular distance from the lens are clearly depicted (objects are in focus) on the image plane, while objects at other distances are mapped blurred (objects are defocused) proportional to their distance from the plane of focus. The latter situation for a point source is depicted in FIG. 1.

The blur behavior is according to the thin lens formula:

$$\frac{1}{f} = \frac{1}{u} + \frac{1}{v} \tag{1}$$

in which f represents the focal length of the lens, u is the object distance and v is the image distance. From the geometric relations in FIG. 1 and the lens formula, the formula for the distance u can be derived:

$$u = \frac{fs}{s - f - k\sigma f} \text{ if } u > u_0 \tag{2}$$

$$u = \frac{fs}{s - f - k\sigma f} \text{ if } u < u_0 \tag{3}$$

wherein $u_0$ denotes the distance for which points are in focus. The parameter s is the image plane to lens distance and the parameter k is a constant determined by the characteristics of the lens system. The parameters f, s and k are camera parameters, which can be determined from camera calibration. Thus estimating the distance u of an object involves determining the camera parameters and estimating the blur radius a. Thus there is a relation between the blurriness of an image, i.e. a focus characteristic and the distance.

For 2D-to-3D conversion, disparity (inverse depth) is a more relevant quantity than depth itself, as for instance the parallax for rendered views is linear in disparity. Using the above expression it is possible to find a relation between disparity differences between points in focus and out of focus and the blur radius a.

$$\left| \frac{1}{u} - \frac{1}{u_0} \right| = \frac{k\sigma}{s} \tag{4}$$

In other words, the disparity difference to the focal plane is proportional to the blur radius. Moreover, as the amount of disparity for rendered views can usually be changed to accommodate for the preference of the user and/or the possibilities of the display, accurate determination of the camera-related constant k/s is not necessary, all that is needed is determination of the blur radius σ, i.e. of a focus characteristic. In the following description, the blur radius is taken for the focus characteristic for the simple reason that there is a simple relation between distance and blur radius. However, although determining the blur radius as the focus characteristic is preferred, due to the simple relation between blur radius and distance, other measures of blurriness could also be determined within the concept of the invention.

Figure 2A:
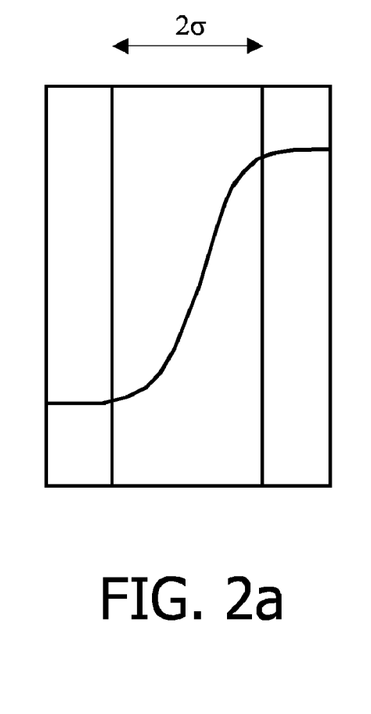
FIGS. 2A-2C illustrate a possible method for determining blur radius.
Figure 2B:
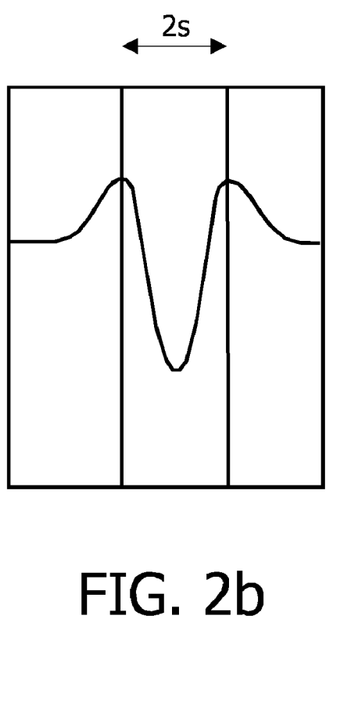
Figure 2C:
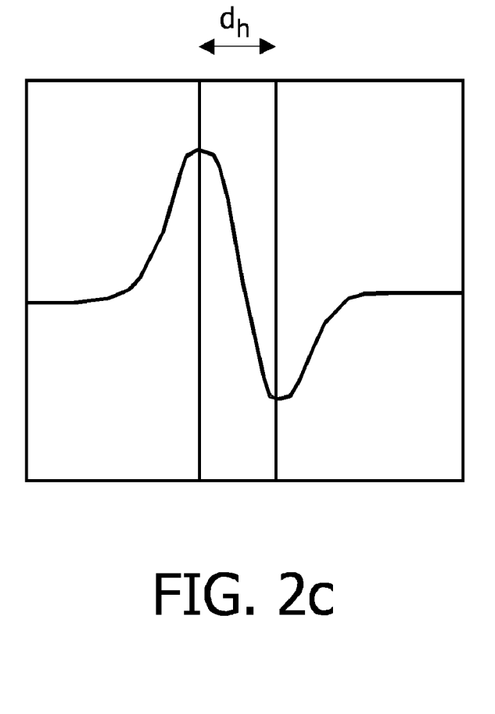

FIGS. 2A-C schematically illustrate a possible method for determining blur radius σ. In FIG. 2A a blurred edge with a blur radius σ is schematically shown. The horizontal axis denotes position, the vertical axis luminance. In FIG. 2B a filtering function is shown which is the second derivative of a Gaussian filter with width s. Convolution of FIG. 2A and FIG. 2B provides for a function having two peaks. The distance $d_h$ between the peaks can be measured reasonably adequate and the relation between the blur radius σ, filter width s and peak distance $d_h$ is as follows:

$$\sigma^2 = (d_h/2)^2 - s^2 \quad (5)$$

This exemplary algorithm is robust and the results obtained for various types of content were good. Taking various filter widths s for each pixel for each filter width a value for the blur radius σ is found. Taking an average or median value of σ per pixel and then determining an average or median value for σ over a block wherein more pronounced edges, which have a larger height in part FIG. 2C, are given a larger weight proved to give robust results. A reasonably good distinction in determined values for σ between the in-focus and out-focus regions is found.

Figure 3:
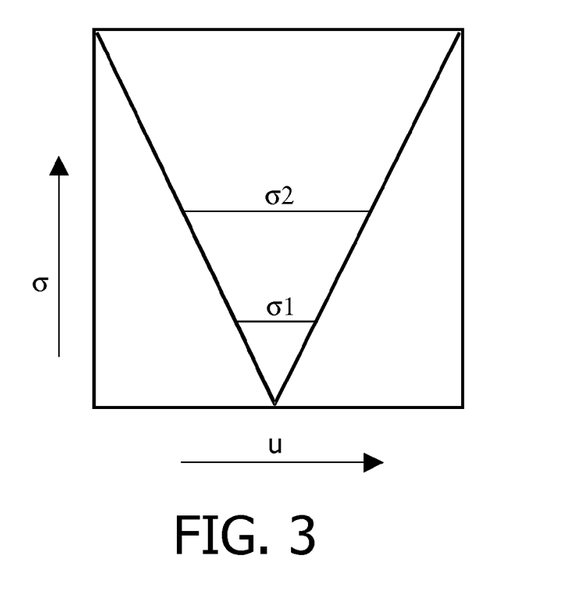
FIG. 3 illustrates the relation between blur radius and focal plane.

The relation between u and the blur radius σ is schematically shown in FIG. 3 and follows from equation (4).

If the parameters k and s are known from calibration, then a true estimate of the absolute distance to the focal plane can be made, once the blur radius σ is known. Since this does not reveal if a blurred object is in front of the focal plane or behind it, also at least two images for different focal distances need to be known for true depth estimation from the blur radius σ. However, neither of these requirements is usually known or obtainable for arbitrary externally given image data such as e.g. video. A good distinction can nevertheless be made between out-of-focus regions of the image and in focus regions of the image and, if there are more regions, between the various regions.

Figure 4:
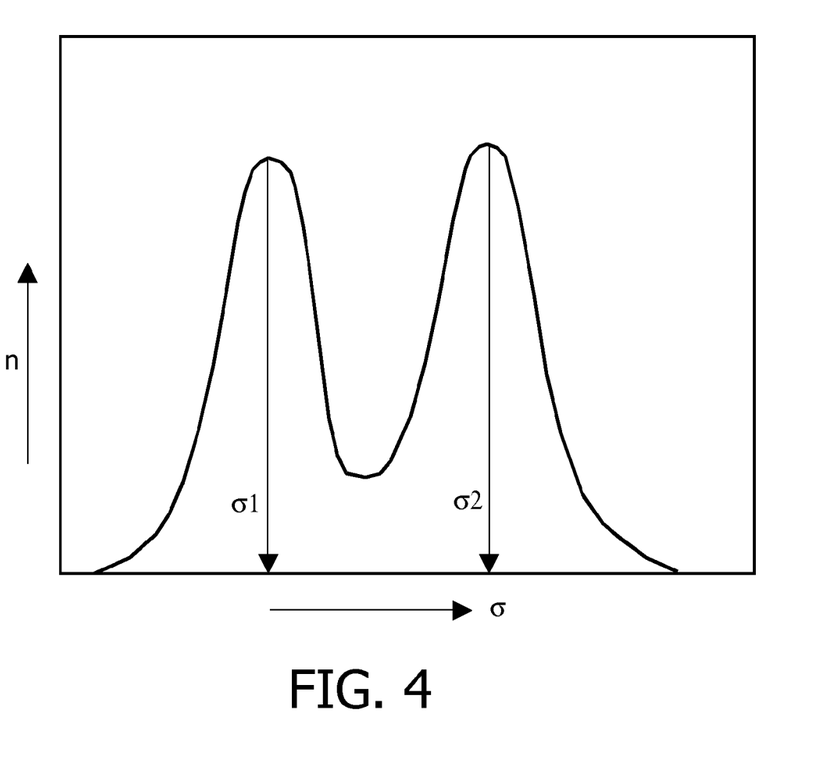
FIG. 4 illustrates a statistical distribution of blur radii.

Since the formula between the disparity difference and the blur radius gives a relation between the absolute value of the disparity difference and the blur radius, the equation has two separate solutions. Hence determination of two different values of the blur radius σ does not enable depth ordering, as the same values of σ may result from an object closer to or further away. In FIG. 4 this is schematically shown for two different values for the blur radius σ (σ1 and σ2). In principle there are four different possible combinations of image planes possible.

FIG. 4 shows a typical distribution of blur radii for blocks within an image wherein the horizontal axis denotes the percentage of blocks with a certain blur radius. Clearly two modes centered on peaks with values of $\sigma_1$ and $\sigma_2$ can be distinguished corresponding in this example with in-focus and out-of-focus parts of the image. Such a distribution alone, however, does not enable to provide an accurate depth ordering for two reasons. First of all, as explained in relation to FIG. 3, there is ambiguity as to the actual relative position of image planes corresponding with the peaks in FIG. 3 since more than one solution is possible. Secondly the peaks in the distribution in σ are quite broad. This indicates that the actual blur values have a high numerical uncertainty and may not be suitable for deriving depth ordering information, as blur radius difference (the spread in the peaks in FIG. 3) in each mode (e.g. the out-of-focus region) may exceed blur radius differences between modes. Hence only using actual numerical values of the blur radius to decide on depth ordering and depth ordering of each block introduces a large amount of noise.

To nevertheless obtain reliable depth ordering the method and device in accordance with the invention executes two steps.

In a first step the pixels or blocks of the image are clustered based on their focusing characteristic, thereby forming regions within the image. Within the broadest scope of the invention, also pixels could be clustered. However, the spread in values of σ for pixels is even larger than for blocks. More robust results are obtained when, prior to clustering a focusing characteristic, in the examples given an average or median value for the blur radius σ, is assigned on a block basis and the blocks are clustered into regions on the basis of the block values for σ. To each region an average or medium blur radius is assigned. Clustering may be done in various manners.

A simple iterative clustering algorithm may be used which always divides the image into two or more clusters starting from a heuristic initial clustering. The decision whether we have one, two or more clusters is then based on the similarity of the characteristics of the clusters.

Figure 5A:
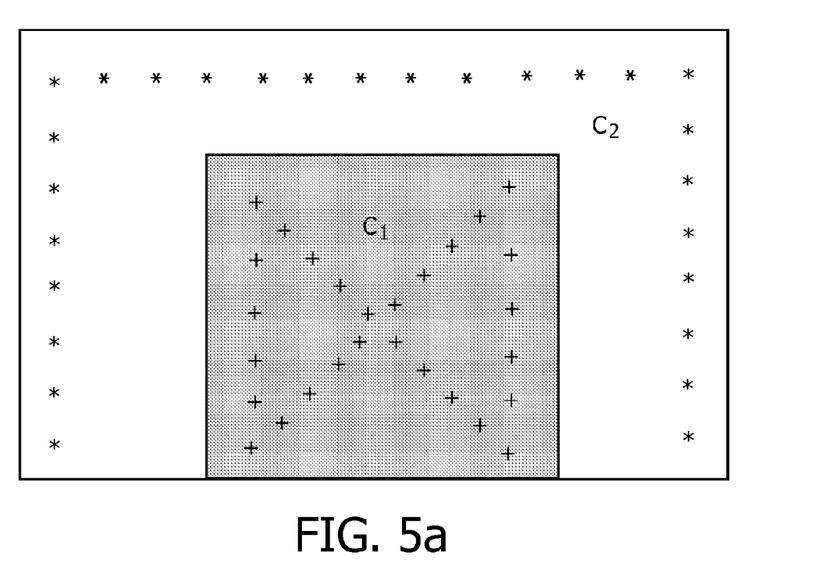
FIGS. 5A and 5B illustrate a method of determining regions.
Figure 5B:
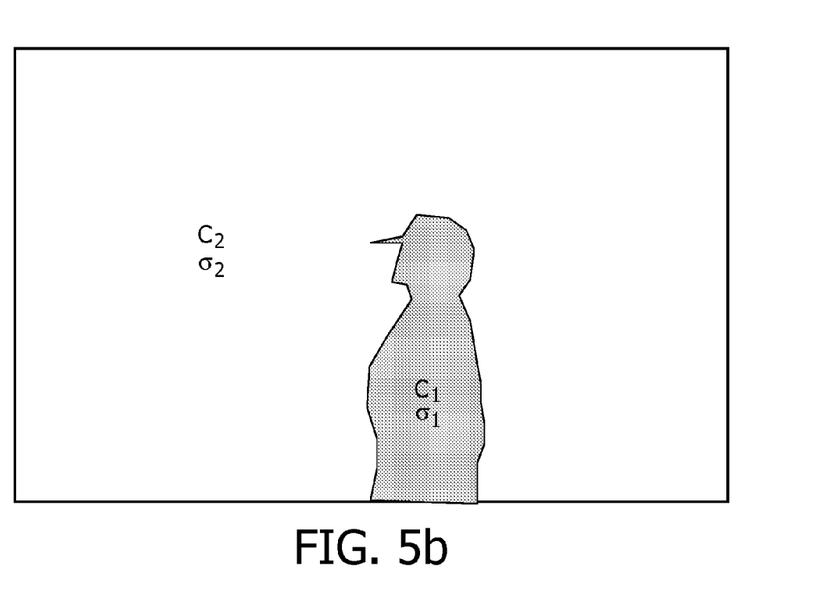

FIGS. 5A and 5B illustrate such a method wherein it is assumed that there are two large regions, one in focus and more or less in the middle, surrounded by an out-of-focus region. The initial clustering consists of assigning the blocks on the left, top and right border (say ¼ of the image) to the 'background' cluster $C_2$, and the other pixels to the 'foreground' cluster $C_1$ (see FIG. 5A). This choice originates from the selection of blocks for background motion model estimation. Heuristically, one expects that the object of interest (usually the foreground) is somewhere in the center of the image, and the borders of the image do not contain objects of interest. For background motion model estimation, it is assumed that the object of interest in the center is the foreground. It is, however, not necessary to make such an assumption in the clustering stage. It has been observed, however, that most of the time the center cluster is in focus.

As the initial clustering is rather coarse and based on heuristics, a robust method to arrive at initial estimates of the blur radii for each cluster is as follows.

A number of feature points (in our case 28), regularly distributed inside the clusters is selected. The initial blur radius value $\sigma_1$ respectively $\sigma_2$ of a cluster is the median of the blur radii σ of all those feature points.

Then an iterative procedure is carried out to refine this cluster:

Step 1: Reassign the blocks. A sweep is made over the image, and each block B on a cluster boundary is assigned to the cluster to which it has the smallest deviation to its mean focus estimate:

$$B \rightarrow C_1 \text{ if } |\sigma_B - \sigma_1| < |\sigma_B - \sigma_2| \quad (6)$$

$B \rightarrow C_2$ else

Step 2: Update the values for $\sigma_1$ and $\sigma_2$. Blocks have been reassigned to clusters $C_1$ and $C_2$ so new average or median cluster blur radii $\sigma_1$ and $\sigma_2$ are computed for each of the two (or more if there are more) clusters.

Step 3: Iterate. A new sweep is made, see step 1.

This process converges after a few (typically 4) iterations.

FIG. 5B shows the result of such iteration: two regions are formed, a foreground region $C_1$ with a median blur radius $\sigma_1$, and background region $C_2$ with a median blur radius $\sigma_2$.

Typically this method provides for two regions, an out-of-focus region and in a in-focus regions. These regions need not be connected, e.g. the in focus regions may comprise two separate sub regions, as may the out-of-focus region. When the statistics shows evidence of three regions, i.e. three peaks in the σ distribution, it is possible to start with three regions. An initial clustering may also be found by determining the peaks in the σ diagram, and simply assigning each block to the peak with the best matching σ.

Figure 6:
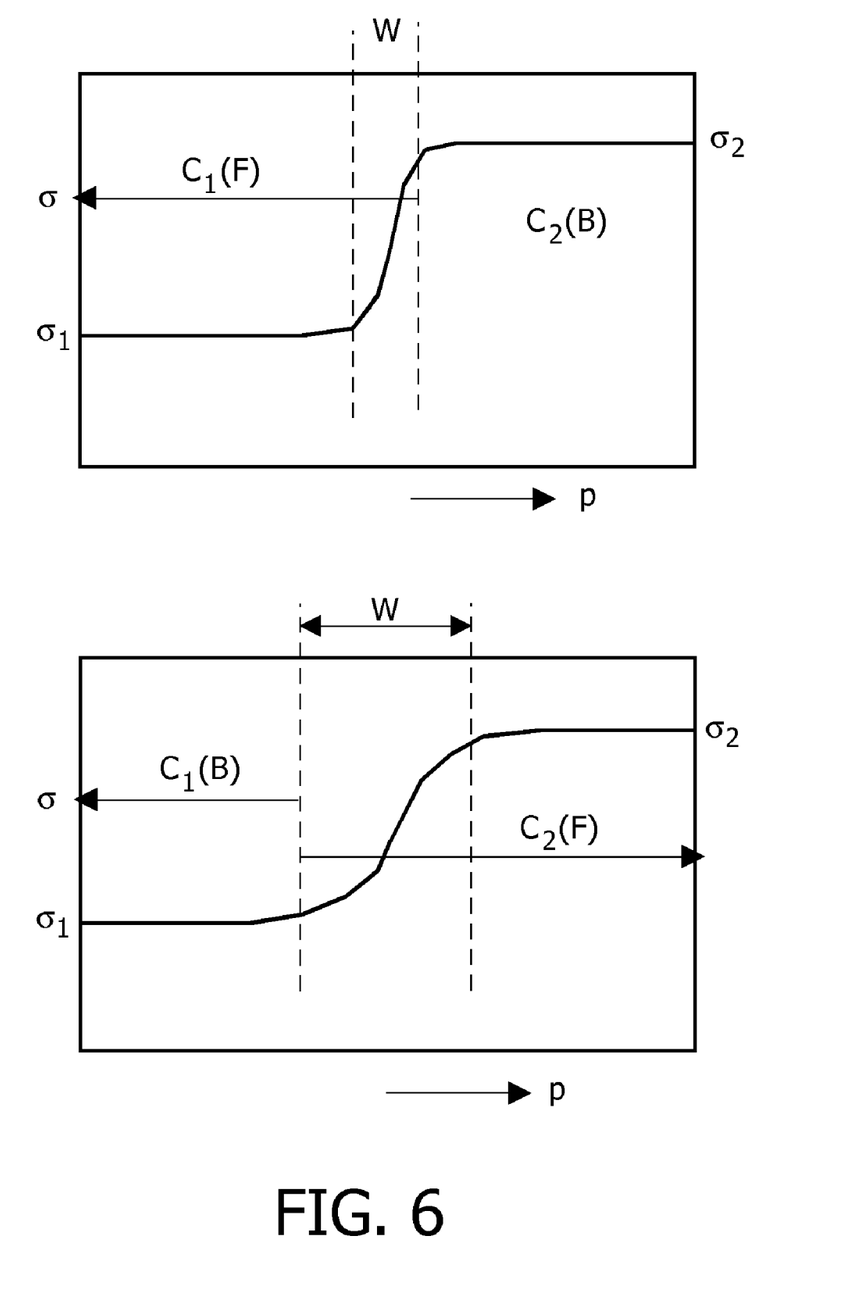
FIG. 6 illustrates a method for deciding to which regions an edge belongs.

Once the image is divided into regions $C_1$, $C_2$, $C_{3\ etc}$, it is possible to assign a region blur radius $\sigma_i$ to each of the regions. The next step in the method and device in accordance with the invention is that the mutual position, i.e. which region is in front of which region, of the regions is determined. A decision on depth ordering has to be made. In order to do so use is made of the principle that an edge belongs to the foremost object. FIG. 6 illustrates schematically a method for distinguishing from this principle which edge belongs to which regions. FIG. 6 shows along the horizontal axis a position parameter, such as the x, or y coordinate, or a coordinate perpendicular to a transition between two regions. Vertically the blur radius is shown. In FIG. 6 schematically the transition between an in-focus region with a low value for blur radius σ and an out-of-focus region with a high value for σ is shown. The width W illustrates schematically the blurriness of the edge. An out-of-focus edge will have a larger width W than an in-focus edge. Schematically this is shown in the top part of FIG. 6, having a small W and thus a sharp transition, and the bottom part, showing a large width W and thus a blurred transition. Thus in the top part the edge separating the regions $C_1$ and $C_2$ belongs to the region $C_1$ with low blur radius $\sigma_1$. Thus region $C_1$ is foreground, which is indicated in the figure by $C_1(F)$. Region $C_2$ is background indicated by $C_2(B)$. In the bottom part the width W is large. The edge separating the regions $C_1$ and $C_2$ belongs to the region $C_2$ with high blur radius 2. Thus "blurred" region $C_2$ is foreground, which is indicated in FIG. 6 by $C_2(F)$. Region $C_1$ is background indicated by $C_1(B)$. By taking various measurement points along lines perpendicular to the transition lines between the regions, and taking an average or deciding for each measure point to which the region the edge seems to belong and then voting between the different measurements, it is easily found whether the edge belongs to the an in-focus region, in which case the in-focus region lies in front of the out-of-focus region, or to an in-focus region, in which case the in-focus region lies in front of the out-of-focus region. To put it differently, the width W is only dependent on the σ of one the regions, not or at least hardly on the σ of the other region. This characteristic can be used to determine to which regions an edge separating two regions belong.

This is one example of a method for establishing to which region an edge belongs.

A different method is for instance to segment the image, i.e. the find luminance or color edges in the image near the transitions between the regions and compare them to the edges between the regions as follows from the preceding clustering step.

Using luminance segmentation, different methods may be used to find which edge belongs to which regions. One way is to look at the orientation of luminance edges in the various regions near the transition between the regions. The luminance edge corresponding to the transition between regions is determined solely by the foreground image and the edge or edges belonging to the foreground image often follow the transition, i.e. they are parallel to the transition. Luminance edges in the background tend not to have a relation to the transition.

Yet another method is the following: the image is segmented based on focus, as explained above, and luminance edges are found near the transitions between the regions. By determining the edge between regions in two different ways, by luminance segmentation and by clustering on the basis of blur radius it may be established to which region an edge belongs. Ideally the two determinations would completely coincide, but this is not the case. It has been found that clustering of blocks tends on average to extend the region to which an edge belongs to slightly beyond the luminance edge because the whole edge or at least a major part of the edge is assigned the blur radius of the edge which belongs to the foreground object. There is thus a slight bias in clustering which extends a clustered region to include the edge belonging to said cluster. This bias does not occur for determination of edges when solely differences in luminance are concerned because in luminance segmentation the transition between the regions is drawn in the middle of the edge separating the regions. There is thus a small difference in the determined position of the edge, since the clustering method based on blur radius determination as described above tends to overextend the border of the clustered foreground region to include into a region the edge belonging to said region, whereas such tendency to overextend does not exist for edges solely determined on the basis of luminance segmentation. To put it differently: luminance segmentation puts the edge exactly in the middle of the luminance transition, whereas clustering segmentation overestimates the size of the foreground region. This effect is also called morphological dilatation, i.e. the clustering slightly dilates, i.e. increases in size, the form of the foreground object. This bias of the clustering method draws foreground object edges into the foreground cluster. This seemingly negative effect can be brought to good use by comparing the edge as determined by luminance segmentation to the same edge as determined by blur radius segmentation. This allows to establish to which regions an edge belongs. Blur radius determination or more in particular determination of focus characteristics may be done using alternative algorithms. Alternative algorithms for clustering may also be used. Depending on the used algorithms the so determined foreground region will overextend or underextend in respect of edge determined by luminance edges. In both cases it is possible to determine to which region an edge belongs by comparing the regions determined by luminance segmentation to the regions determined by determination and clustering of focusing characteristics.

Depth ordering can be done simply on the basis of what region is foreground and what region is background, i.e. a fixed difference in parallax can be used to distinguishing the foreground and background regions, or foremost, intermediate range and background regions, independent of the actual values $\sigma_i$.

Preferably the blur radius estimates for the regions are converted into a depth or inverse depth value. Given the depth orderings and σ values we may take the disparity of blurred objects as the disparity of in focus objects, i.e. the region with lowest σ, plus a constant time the difference in blur radius between foreground and background.

$$\frac{1}{u} \approx \frac{1}{u_0} + K\Delta\sigma$$

Wherein Δσ is the difference in σ, K is a constant and $u_0$ is the focus plane. If σ is very small Δσ equals σ of the out-of-focus plane. The cluster with the lowest blur value is assigned the depth $u_0$; all other clusters are assigned a depth value based on their depth ordering with respect to the cluster with the lowest radius value. In case we have only two clusters, in-focus and out-of-focus, K is positive if the foreground in is focus and negative of the out-of-focus region is foreground.

For single image blur radius estimation, the constants $u_0$ and K can not be recovered, for this we would need multiple images with different focal settings. However, if we only use the depth map for rendering, most of the time the depth map is translated and scaled anyhow to match the capabilities of the screen and the preferences of the user. For an autostereoscopic display device, we may for instance take $u_0$ in such a way that the in-focus region is rendered in the plane of the screen to have a maximal sharp image. The out-focus region can then be rendered behind or in front of the screen, depending on the depth ordering.

Figure 7:
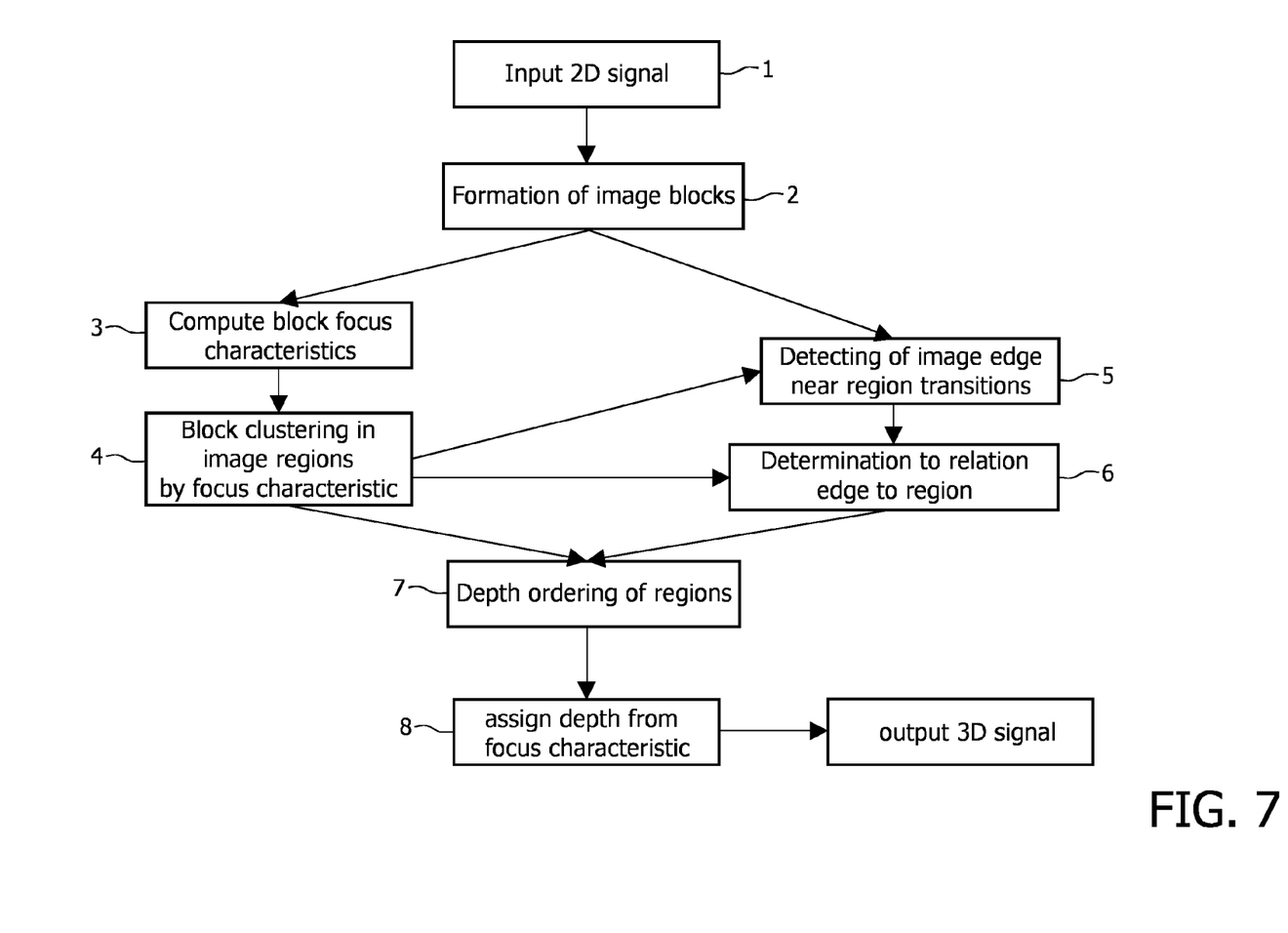
FIG. 7 illustrates a method in accordance with the invention.

FIG. 7 shows a method in accordance with the invention. From an input 2D signal, image blocks are formed in step 2, block focus characteristics, for instance the block blur radius $\sigma_B$ are determined in step 3, these blocks are clustered into two or more clusters in step 4. In step 6 the relation between the edge and the region is determined. This may be done directly from the focus characteristics, see FIG. 6, or in parallel the image may be luminance segmented and image edge obtained by luminance segmentation (step 5) are compared in step 6 to edge determined by clustering wherein comparing the results leads to the determination of which edge belong to which regions and thereby which regions are positioned in front of which regions, i.e. the depth ordering of regions (step 7). The depth is determined from the focus characteristics (step 8) in accordance with a preferred embodiment, which in the examples given is the blur radius, the resulting 3D output signal is provided (step 9).

Figure 8:
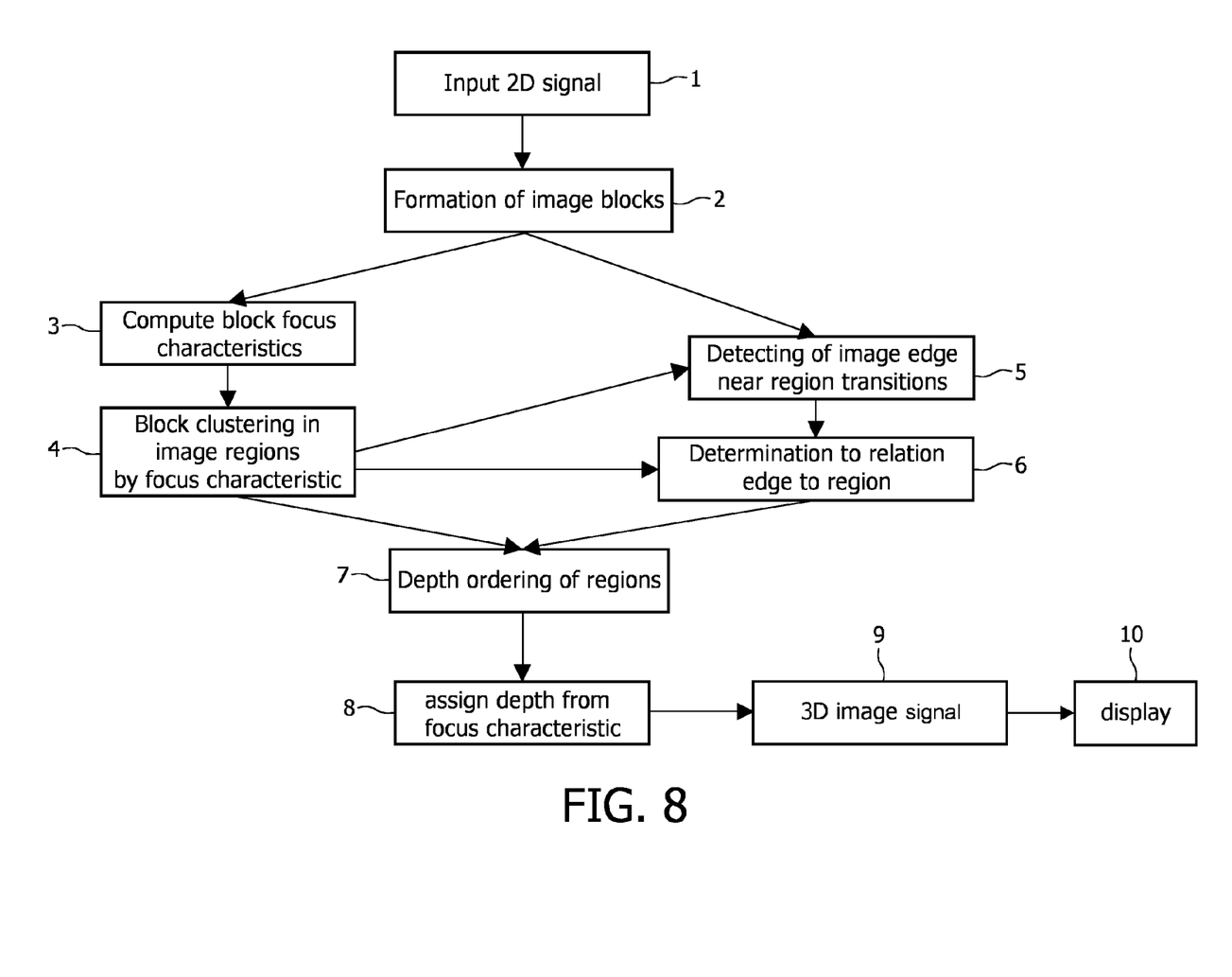
FIG. 8 illustrates a display device in accordance with the invention.

FIG. 8 shows an image device in accordance with the invention. The image device has means for performing all the steps of the method, i.e. an input 1, for receiving a 2D input signal, a former 2 for formation image blocks, a computer 3 for computing block focus characteristics, a clusterer 4 for clustering image regions on basis of focus, an image edge detector 5, an edge-region relationship determinator 6, a depth orderer 7 and a depth information assigner 8. It furthermore comprises an output 9 for outputting a 3D signal to a 3D display screen 10. Such a display device may for instance an autostereoscopic display device.

Figure 9:
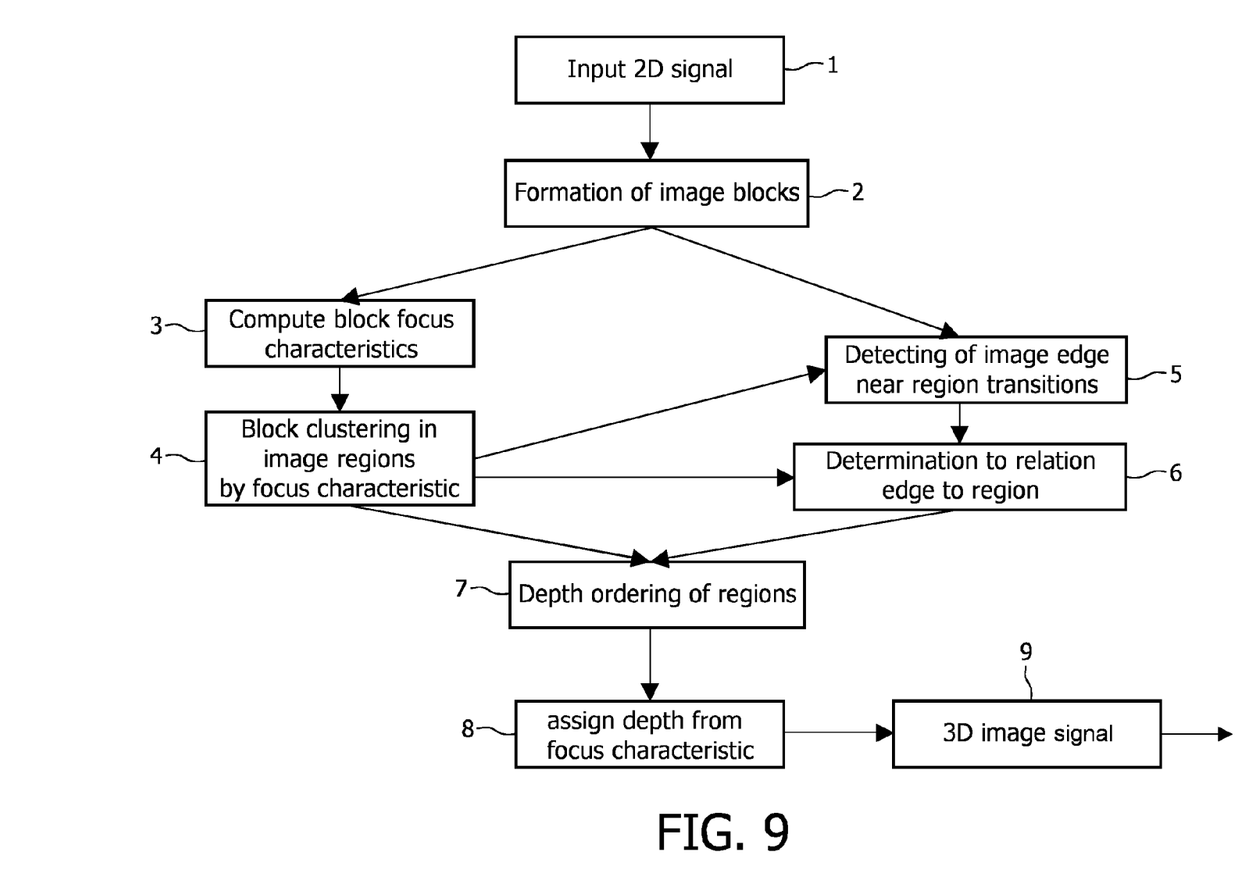
FIG. 9 illustrates a transmitter in accordance with invention.

FIG. 9 shows a transmitter in accordance with the invention. The difference with FIG. 8 is that the display screen itself is not an integral part of the device. Such a transmitter may for instance read DVD's having a 2D signal and converting the 2D signal into a 3D signal for use in 3D display device which may be separately sold. It may also be a device which makes a DVD having 3D signals from a DVD having a 2D signal, the 3D signals may thus be provided to a DVD burner, or for instance sent to another location. 3D image signals comprising information on the division of the image in regions and the depth order of the regions and, in preferred embodiments, also the focus characteristic of the various regions also form embodiments of the invention. The information may be given in a header in the signal, which header specifies which blocks belongs to the regions, or the dividing lines between the regions, the order of the regions and preferably also the focusing characteristics of the regions, preferably the region blur radii. A 3D signal made with the prior art methods and devices does not comprise such information. A 3D signal in accordance with the invention could for instance be generated as follows: A customer has a 3D display device but a normal 2D digital camera. A user sends a 2D home video or digital image to an internet site. The original 2D signal is converted into a 3D signal, which is sent back to the user which can display the video or image on his 3D display.

In short the invention can be described as follows:

2D image data are converted into 3D image data. The image is divided, on the basis of focusing characteristics, into two or more regions, it is determined to which region an edge separating two regions belongs. The regions are depth ordered in accordance with the rule that the rule that a region comprising an edge is closer to the viewer than an adjacent region and to the regions 3-D depth information is assigned in accordance with the established depth order of the regions. Preferably to each of the regions a depth is assigned in dependence on an average or median focusing characteristic of the region.

The invention is also embodied in any computer program product for a method or device in accordance with the invention. Under computer program product should be understood any physical realization of a collection of commands enabling a processor—generic or special purpose-, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The invention may be implemented by any combination of features of various different preferred embodiments as described above. In particular it is mentioned that any embodiment shown or claimed in relation to an encoding method or encoder has, unless otherwise indicated or impossible, a corresponding embodiment for a decoding method or decoder and such decoding methods and decoder are embodiments of the invention and claimed herewith.

The invention claimed is:

1. A method of converting image display data wherein 2D image data are converted into 3D image data comprising the 2D image data and depth information, the method comprising:
   extracting focus information ($\sigma$) from the 2D image data,
   generating at least some of the 3D image data using the extracted focus information,
   dividing the 2D image into two or more regions ($C_1$, $C_2$) based on the extracted focus information such that pixels or blocks of the 2D image are clustered into regions, the regions having a respective focusing characteristic ($\sigma_1$, $\sigma_2$),
   the method characterized in that it further comprises:
   determining a luminance edge near a transition between two regions of the two or more regions;
   establishing a depth order between the two regions following the rule that a region comprising the luminance edge is closer to the viewer than an adjacent region and
   assigning depth information to the two regions in accordance with the established depth order of the two regions.

2. The method as claimed in claim 1, wherein, prior to dividing the image into regions, a focusing characteristic is assigned on a block basis (3) and the blocks are clustered into regions (4).

3. The method as claimed in claim 1, wherein the 3D depth information is assigned (8) in dependence on the focusing characteristics ($\sigma_1$, $\sigma_2$) of the regions ($C_1$, $C_2$).

4. The method as claimed in claim 1, wherein the image is divided in two regions ($C_1$, $C_2$).

5. The method as claimed in claim 1, wherein the image is divided in three regions ($C_1$, $C_2$, $C_3$).

6. An apparatus for generating 3D image data from a 2D image data input, the apparatus comprising:
- an input (1) for 2D image data,
- an output for outputting at least some of the 3D image data, and
- a converter to convert the input 2D image data into 3D image data, the converter comprising:
  - a processor to extract focus information from the 2D image data, cluster the image on the basis of the extracted focus information into two or more regions ($C_1$, $C_2$) having a respective focusing characteristic ($\sigma_1$, $\sigma_2$), determine to which region of the image an edge separating two regions belongs, to depth order the regions following the rule that a region comprising an edge is closer to the viewer than an adjacent region and assign depth information.

7. A computer program product comprising a plurality of program code portions, stored in a non-transitory computer readable medium to be loaded by a computer arrangement, comprising instructions to generate 3D image data on basis of a 2D image data input, the computer arrangement comprising processing means wherein the instructions are arranged for performing a method as claimed in claim 1.

8. The method of claim 1, wherein the focus characteristic is a measure of blurriness.

9. The method of claim 1, wherein the measure of blurriness is a blur radius.

10. The method of claim 1, further comprising the step of:
- displaying the 3D image data on a stereoscopic image display.

11. The apparatus of claim 6 further comprising a 3D display screen and wherein the output is arranged for outputting the 3D image data to the 3D display screen.

12. The apparatus of claim 11 wherein the 3D display screen is an autostereoscopic display device.

* * * * *